United States Patent [19]

Maru et al.

[11] Patent Number: 4,458,917
[45] Date of Patent: Jul. 10, 1984

[54] SUSPENSION APPARATUS

[75] Inventors: Hideki Maru, Wako; Tetsuro Mitsui, Niiza; Takeomi Miyoshi, Wako, all of Japan

[73] Assignee: Honda Giken Kogyo Kabushiki Kaisha, Tokyo, Japan

[21] Appl. No.: 344,824

[22] Filed: Feb. 1, 1982

[30] Foreign Application Priority Data

Feb. 2, 1981 [JP] Japan ................... 56-12988
Feb. 3, 1981 [JP] Japan ................... 56-13762

[51] Int. Cl.³ ............... B60K 17/32; B60G 11/10
[52] U.S. Cl. ..................... 280/705; 280/718; 267/11 R; 267/18
[58] Field of Search ......... 280/705, 708, 720, 697, 280/699; 267/11 R, 12, 13, 15, 18, 19 R, 32

[56] References Cited

U.S. PATENT DOCUMENTS 2,973,195 2/1961 Armstrong ................ 280/705
3,395,931 8/1968 Piret ....................... 280/705
4,087,115 5/1978 Earle ....................... 280/720
4,165,098 8/1979 Wagner ..................... 280/705

Primary Examiner—Richard A. Bertsch
Attorney, Agent, or Firm—Armstrong, Nikaido, Marmelstein & Kubovcik

[57] ABSTRACT

A suspension apparatus for a vehicle which comprises an axle beam for mounting a wheel on each end thereof, a Panal rod connected between the axle beam and the body of the vehicle, for supporting the axle, and a pair of trailing arms, each trailing arm being connected between the axle rod and the body of the vehicle, at least one of the trailing arms including bearings for connecting the trailing arms to the axle such that the trailing arm is rotatable about the axle. The suspension apparatus further includes a stabilizer bar extending parallel to the axle beam, the stabilizer bar having one end connected to the longitudinal middle of the axle beam and the other end connected to a trailing arm.

5 Claims, 5 Drawing Figures

SUSPENSION APPARATUS

BACKGROUND OF THE INVENTION

1. Field of the Invention

This invention relates to a suspension apparatus chiefly for a rear one of a motorcar.

2. Description of the Prior Art

There has been hitherto known a suspension apparatus, as shown in FIG. 1, which has an axle beam b having a pair of right and left wheels a, a, supported on a vehicle body side through a Panhard (rod not illustrated) and a pair of right and left trailing arms c, c extending forward. Generally, with this type of suspension apparatus, the pair of trailing arms c, c are connected rigidly to the axle beam b. This type of suspension apparatus has the disadvantage that when the two wheels a, a are caused to differ one from another in their stroke positions (as the vehicle body is rolled, for instance), the axle beam b has a twist force on it, and, therefore, it is necessary to absorb this twist force, and accordingly the axle beam b must be an open type of beam with the cross section thereof in the shape of an I, U or the like, and it is difficult to use a closed type of beam such as a circular pipe or the like.

It has been also hitherto known with this type of apparatus that, as shown in FIG. 1, there is additionally provided a stabilizer bar d extending substantially along the axle beam b. Generally, the stabilizer bar d extends between the pair of trailing arms c, c. However, the stabilizer bar is too large in strength, and this is not desirable from the view point of making the apparatus lighter in weight.

SUMMARY OF THE INVENTION

It is the primary object of the present invention to provide a suspension apparatus for a vehicle which eliminates the twisting force applied to axle beams as in prior art devices.

It is another object of the present invention to provide a suspension apparatus which has an axle beam with a closed cross-section.

It is a further object of the present invention to provide a suspension apparatus which has a stabilizer bar which is substantially shorter than prior art stabilizer bars.

The present invention is directed to a suspension apparatus of the type with an axle beam having a pair of right and left wheels supported on a vehicle body side through a Panhard rod and a pair of right and left trailing arms extending forwards. It is characterized in that at least one of the trailing arms is so connected to the axle beam as to be turnable thereabout through a bearing member such as a ball bearing or the like.

The suspension apparatus of the present invention additionally includes a stabilizer bar extending substantially along the axle beam, wherein the stabilizer bar is fixed at one end to either one of the pair of trailing arms and is fixed at its other end to the middle portion of the length of the axle beam.

DETAILED DESCRIPTION OF THE PREFERRED EMBODIMENT

Figure 2:
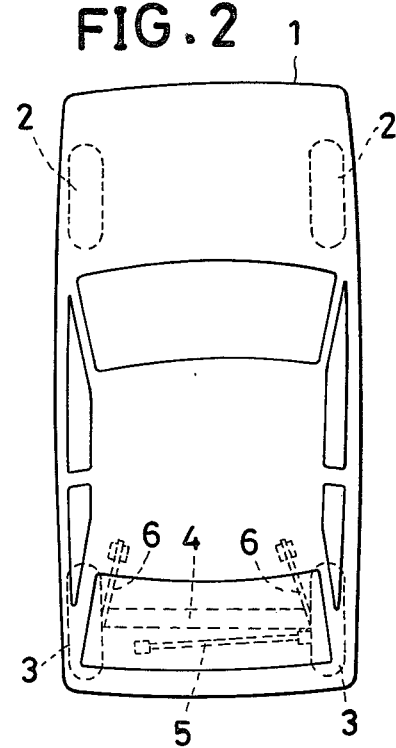
FIG. 2 is a diagramatical top plan view of one embodiment of the present invention used on a motorcar.
Figure 3:
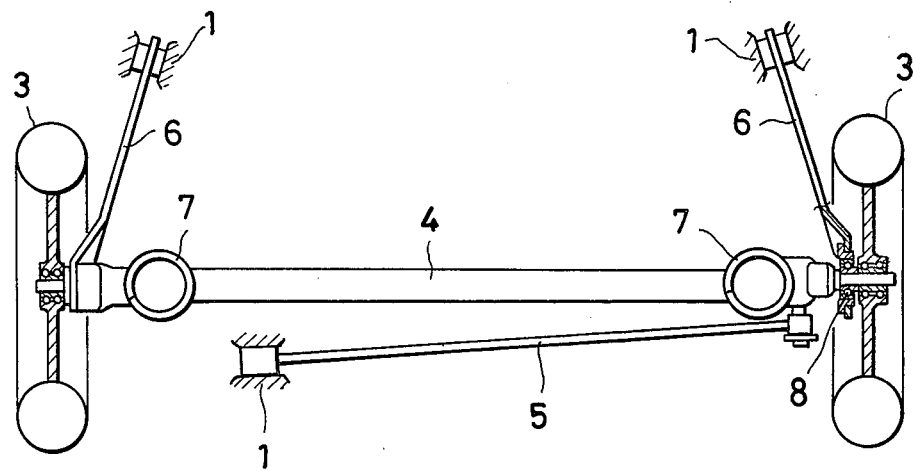
FIG. 3 is an enlarged top plan view, partly in section, of an important portion thereof.

FIGS. 2 and 3 show one embodiment of the present invention, which comprises a vehicle body 1 of a motorcar, a pair of right and left front wheels 2, 2 and a pair of right and left rear wheels 3, 3. An axle beam 4 having the two rear wheels 3, 3 mounted on the ends thereof, is supported on the vehicle body 1 through a Panhard rod 5 extending laterally and a pair of right and left trailing arms 6, 6 extending forwards. A pair of right and left coil springs 7, 7 are disposed on the upper side of both end portions of the axle beam 4.

At least one of the pairs of trailing arms 6, 6, that is, the arm 6 on the right-hand side in the drawings, for example, is connected to the axle beam 4 so as to be turnable thereabout through a bearing member 8, such as a ball bearing. The arm 6 on the left-hand side is connected rigidly to the beam 4 in the same manner as in a conventional suspension apparatus. The beam 4 is not subject to a twist force as described in connection with prior art suspension apparatuses and, therefore, the beam can be a closed type in cross-section such as a circular pipe or the like which is advantageous in strength.

The operation of the apparatus of this example will now be explained as follows:

The axle beam 4 is held in position with respect to the front and rear directions and the upper and lower directions by the pair of trailing arms 6, 6, and also is held in position with respect to the right and left directions by the Panhard rod 5. If the two wheels 3, 3 are caused to differ one from another in their stroke positions, one of the two arms 6, 6 is turnable in relation to the beam 4 through bearing member 8 and thus, there is no twist force applied to the beam 4.

Thus, according to this invention, since the axle beam is not subjected to the twist force, it can be a closed type of beam such as a circular pipe, for example, which is advantageous in its bending strength, and consequently the apparatus can be comparatively small in weight.

Figure 1:
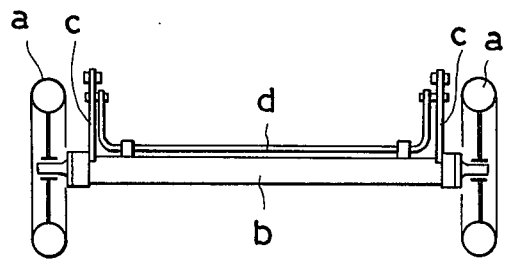
FIG. 1 is a prior art suspension apparatus.
Figure 4:
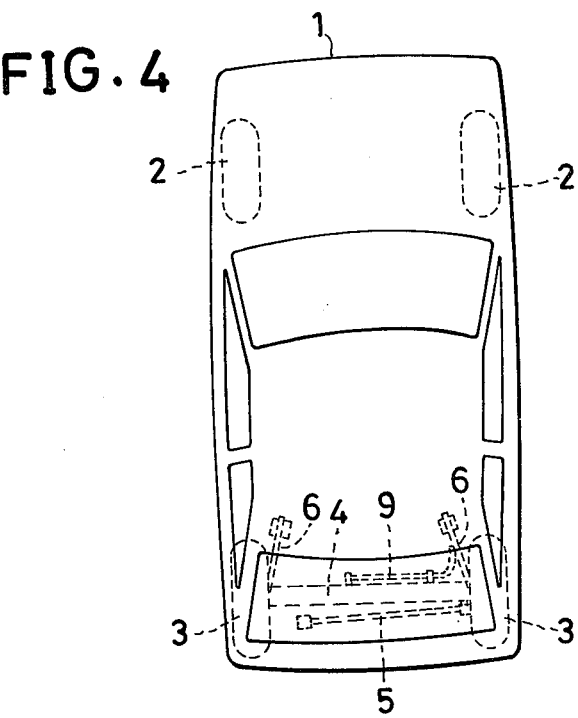
FIG. 4 is a diagramatical top plan view of another embodiment of the present invention.
Figure 5:
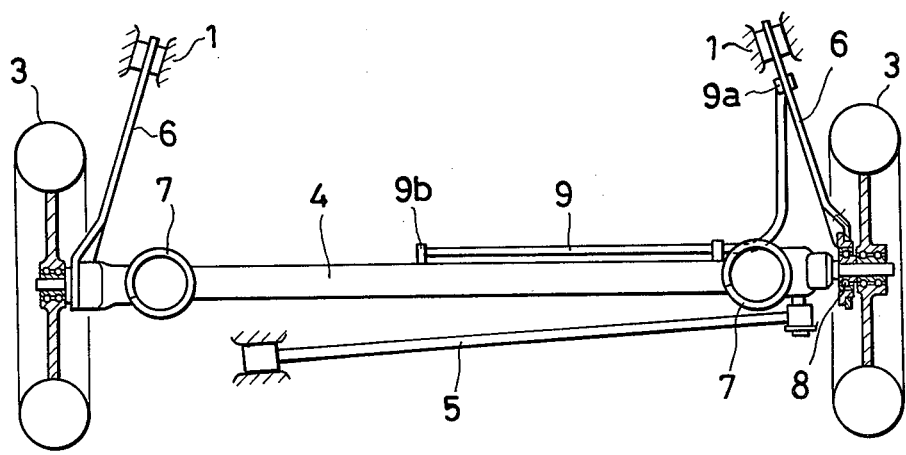
FIG. 5 is an enlarged top plan view, partly in section, of an important portion thereof.

FIGS. 4 and 5 show another embodiment of the present invention. In this example, the apparatus of the first embodiment is additionally provided with a stabilizer bar 9 extending substantially along the axle beam 4. The stabilizer bar 9 is fixed at its one end 9a to one of the pair of trailing arms 6, 6, for instance, the arm 6 on the right-hand side in the drawings, and is fixed at its other end 9b to the middle portion of the length of the axle beam 4. Thus, the stabilizer bar 9 is decreased in length in comparison with that extending between the two arms 6, 6 as in the prior art suspension apparatus shown in FIG. 1.

Also, in this case, the one of the arms 6, 6, that is, the arm 6 on the right-hand side is connected to the axle beam 4 so as to be turnable thereabout through the bearing member 8 in the manner described in the first embodiment.

The operation of the apparatus of this example will now be explained as follows:

The axle beam 4 is held in position with respect to the upper and lower directions and the front and rear directions by the pair of trailing arms 6, 6 and is held in position with respect to the right and left directions by the Panhard rod 5. Additionally, the stabilizer bar 9 decreases the degree of rolling when the vehicle body 1 is subjected to rolling. The bar 9 has a twist force applied thereto as a result of rolling of the vehicle body 1 and it decreases the rolling.

Thus, according to the present invention, the stabilizer bar is fixed at one end to one of the pair of trailing arms and is fixed at the other end to the middle portion of the length of the axle beam. The stabilizer bar can, thus, be decreased in weight as a result of the decrease in its length in comparison with prior art suspension apparatuses. This feature is especially advantageous when used with a suspension apparatus in which one of the two trailing arms is turnably connected to the axle beam.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A suspension apparatus for a vehicle comprising:
   (a) an axle beam for mounting a wheel on each end thereof;
   (b) a Panhard rod means connected between said axle beam and the body of the vehicle, for supporting the axle beam; and
   (c) a pair of trailing arm means, each trailing arm means being connected between said axle beam and the body of the vehicle, one of said trailing arm means including bearing means for connecting said trailing arm means to said axle beam such that said one of said trailing arm means is rotatable about said axle beam, the other trailing arm means being rigidly connected to said axle beam.

2. A suspension apparatus as set forth in claim 1, wherein said bearing means is a ball bearing member.

3. A suspension apparatus as set forth in claim 1, including stabilizer bar means extending parallel to said axle beam means, said stabilizer bar having one end connected to the longitudinal middle of said axle beam, and the other end connected to said one of said trailing arm means.

4. A suspension apparatus as set forth in claim 1, wherein said axle beam has a closed cross-section.

5. A suspension apparatus as set forth in claim 4, wherein the cross-section of said axle beam is circular.

* * * * *